United States Patent
Fan et al.

(10) Patent No.: US 11,455,040 B2
(45) Date of Patent: Sep. 27, 2022

(54) DISPLAY DEVICE

(71) Applicant: InnoLux Corporation, Miao-Li County (TW)

(72) Inventors: Sheng-Nan Fan, Miao-Li County (TW); Hung-Sheng Cho, Miao-Li County (TW); Jui-Jen Yueh, Miao-Li County (TW); Yu-Huang Hsu, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 17/139,233

(22) Filed: Dec. 31, 2020

(65) Prior Publication Data

US 2021/0124423 A1 Apr. 29, 2021

Related U.S. Application Data

(63) Continuation of application No. 16/103,308, filed on Aug. 14, 2018, now abandoned.

(60) Provisional application No. 62/558,897, filed on Sep. 15, 2017.

(30) Foreign Application Priority Data

Dec. 13, 2017 (CN) .......................... 201711326837.5

(51) Int. Cl.
*G06F 3/01* (2006.01)
*G06F 3/041* (2006.01)
*G06F 1/16* (2006.01)

(52) U.S. Cl.
CPC ............ *G06F 3/016* (2013.01); *G06F 1/1643* (2013.01); *G06F 1/1652* (2013.01); *G06F 3/0412* (2013.01); *G06F 2203/014* (2013.01); *G06F 2203/04105* (2013.01)

(58) Field of Classification Search
CPC ...... G06F 3/016; G06F 1/1643; G06F 1/1652; G06F 3/0412; G06F 2203/014; G06F 2203/04105
See application file for complete search history.

(56) References Cited

U.S. PATENT DOCUMENTS

| | | | |
|---|---|---|---|
| 9,818,805 B2 | 11/2017 | Choi et al. | |
| 2011/0148608 A1 | 6/2011 | Grant et al. | |
| 2012/0274599 A1 | 11/2012 | Schediwy | |
| 2014/0334078 A1 | 11/2014 | Lee et al. | |
| 2015/0078604 A1 | 3/2015 | Seo | |
| 2015/0097794 A1 | 4/2015 | Lisseman | |
| 2018/0188876 A1 | 7/2018 | Borgerding et al. | |
| 2019/0087004 A1 | 3/2019 | Fan et al. | |

FOREIGN PATENT DOCUMENTS

| | | |
|---|---|---|
| CN | 201234277 Y | 5/2009 |
| CN | 103347129 A | 10/2013 |
| CN | 203289642 U | 11/2013 |
| CN | 103869523 A | 6/2014 |

(Continued)

*Primary Examiner* — Bryan Earles

(74) *Attorney, Agent, or Firm* — Muncy, Geissler, Olds & Lowe, P.C.

(57) ABSTRACT

A display device includes a display panel, a vibrator and an adhesive layer. The vibrator is disposed on a surface of the display panel. The adhesive layer is disposed between the display panel and the vibrator, and a part of the adhesive layer contacts the display panel and another part of the adhesive layer contacts the vibrator.

18 Claims, 9 Drawing Sheets

(56) References Cited

FOREIGN PATENT DOCUMENTS

| | | | |
|---|---|---|---|
| CN | 104143292 | A | 11/2014 |
| CN | 104461115 | A | 3/2015 |
| CN | 105096778 | A | 11/2015 |
| CN | 204759381 | U | 11/2015 |

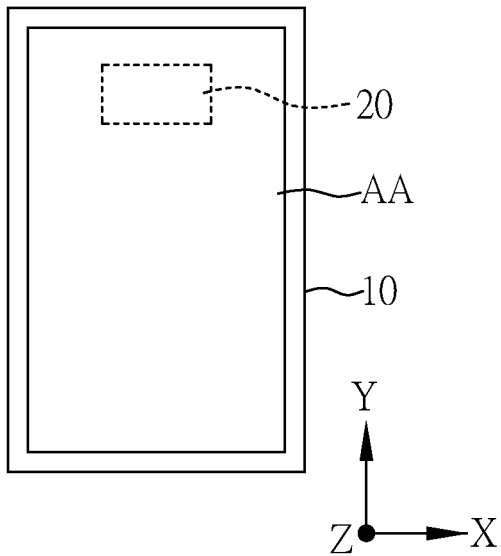
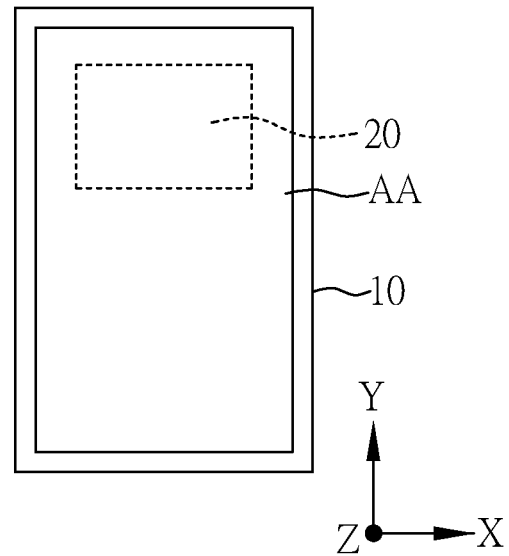
FIG. 4(A)   FIG. 4(B)
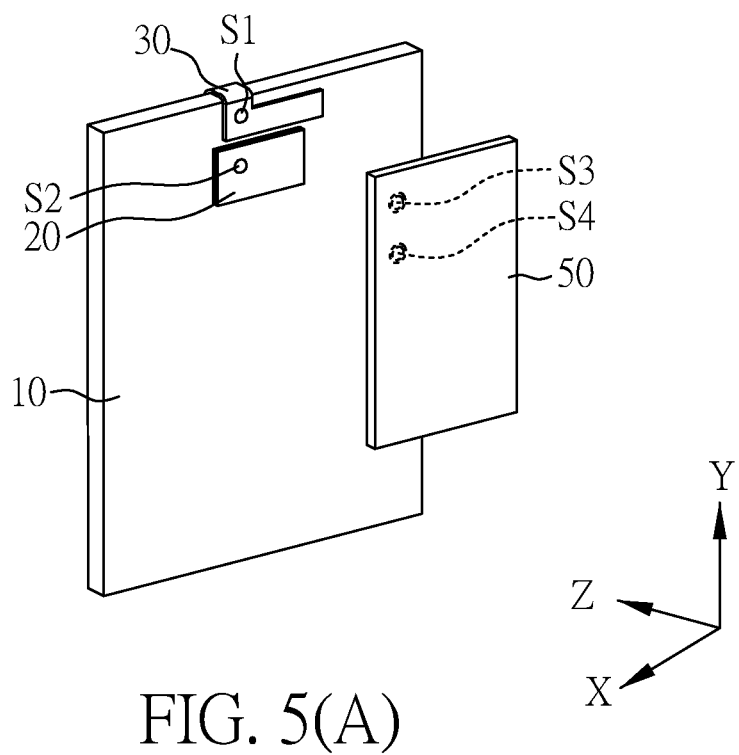
FIG. 5(A)

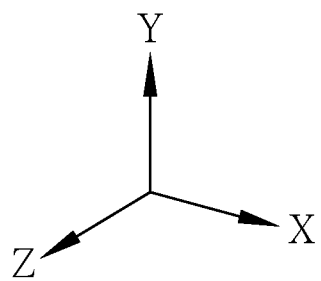
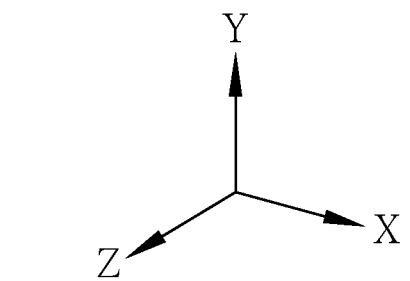
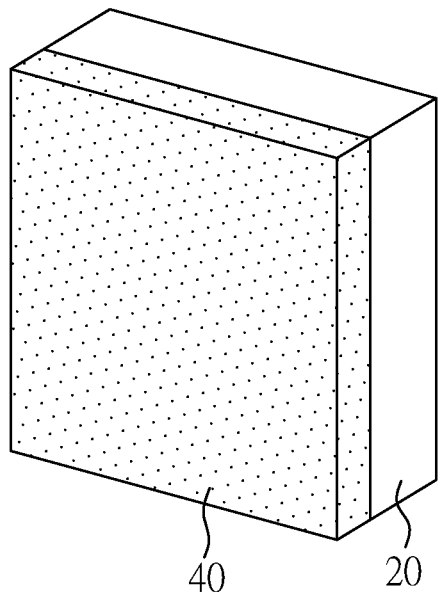
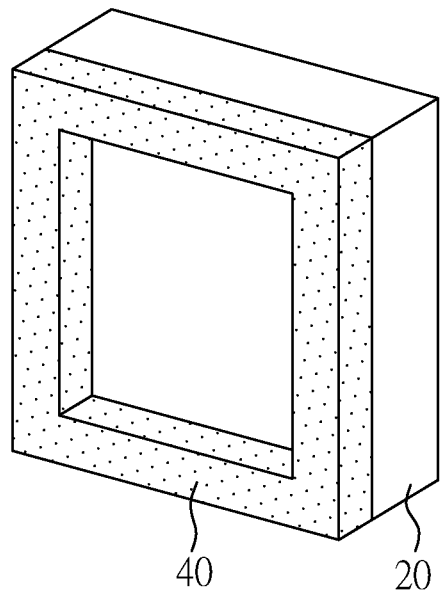
FIG. 6(A)   FIG. 6(B)

DISPLAY DEVICE

CROSS REFERENCE TO RELATED APPLICATIONS

This application is a Continuation of application Ser. No. 16/103,308, filed on Aug. 14, 2018, for which priority is claimed under 35 U.S.C. § 120; and this application claims priority of U.S. Provisional Application No. 62/558,897 filed on Sep. 15, 2017 under 35 U.S.C. § 119(e); and this application claims priority of Application No. 201711326837.5 filed in China on Dec. 13, 2017 under 35 U.S.C. § 119;, the entire contents of all of which are hereby incorporated by reference.

BACKGROUND

1. Field of the Invention

The present disclosure relates to a display device and, more particularly, to a display device with a vibrator.

2. Description of Related Art

Nowadays, pursuing of a display device with a borderless screen has become a tendency, which means that, in the future, it is a key point to increase the screen-to-body ratio of the display device. However, the display device is typically disposed with an acoustic element, which occupies some area of the display device, and thus limits the screen-to-body ratio of the display region. Besides, the user may be bothered by the prior art acoustic element because it sometimes reveals the private acoustic signal to the external. In addition, a typical display device may have a touch feedback function, when the user touches the display device, the display device produces a vibration feedback to notify the user of successful acceptance of his/her touch input. The prior art display device may use a vibration motor to provide the touch feedback function; however, the vibration motor cannot adjust the magnitude of the touch feedback force according to the user's touch force applied on the display device, and thus it cannot enhance the user touch perceptibility. Moreover, the volume and the weight of the vibration motor will limit the implementation of a thin and lightweight display device.

Therefore, in pursuit of a display device with high screen-to-body ratio, the acoustic element is desirable to be improved. In addition, in order to realize a thin and lightweight display device with enhanced user touch perceptibility, the touch feedback element is also desirable to be improved.

SUMMARY

The display device of the present disclosure includes a display panel, a display panel including a substrate and a frame; a vibrator disposed on the frame, wherein a portion of the frame is disposed between the substrate and the vibrator; an intermediary frame covering the vibrator and a surface of the display panel; an outer frame covering the intermediary frame; and an adhesive layer disposed between the frame and the vibrator, wherein a part of the adhesive layer contacts the frame, and another part of the adhesive layer contacts the vibrator, wherein the adhesive layer has an upper layer contacting a bottom of the frame, and a lower layer contacting a top of the vibrator, wherein the vibrator is connected with the frame by the adhesive layer, the vibrator vibrates the display panel to provide touch tactile feedback when the vibrator vibrates at a frequency larger than or equal to 1 Hz and smaller than or equal to 250 Hz, and the vibrator vibrates the display panel to provide acoustic function and generate sound capable of being concentrated inside the display panel when the vibrator vibrates at a frequency larger than or equal to 20 Hz and smaller than or equal to 20 KHz, and wherein the vibrator has a first thickness, the frame has a second thickness, and a ratio of the first thickness to the second thickness is between 50% to 70%.

BRIEF DESCRIPTION OF THE DRAWINGS

FIG. 4(A) is a top view of the display panel according to one embodiment of the present disclosure;

FIG. 4(B) is a top view of the display panel according to another embodiment of the present disclosure;

FIG. 5(A) is a schematic view of the display device and the control motherboard according to one embodiment of the present disclosure;

FIG. 6(A) is a schematic view of the adhesive layer and the vibrator according to one embodiment of the present disclosure;

FIG. 6(B) is a schematic view of the adhesive layer and the vibrator according to another embodiment of the present disclosure;

DETAILED DESCRIPTION

The implementations of the present disclosure will be described with specific embodiments in the following description. A person skilled in the art will understand the advantages and the effects provided by the present disclosure. Different specific embodiments may be applicable according to the present disclosure. The details of the present disclosure may have several modifications or variations according to different aspects and applications based on the spirit of the present disclosure.

Moreover, the orders such as "first", "second", and so on, in the specification and the claims are only used to distinguish the elements with the same name. They do not have their own specific meanings, do not necessarily mean that there is another element existing in addition to one element, and do not mean that there is a priority between one element and another element, or one step and another step.

Besides, in the present disclosure, the description such as "A happens when B happens" may refer to A happens before, when or after B happens, and it does not necessarily refer to A and B happen at the same time, except that a clear limitation is given. In the present disclosure, the description such as "A is disposed on B" refers to the corresponding locations of A and B, and it does not necessarily refer to the contact of A and B, except that a clear limitation is given. Moreover, the word "or" between the elements or their effects in the present disclosure means that the elements and the effects may exist individually or together.

Figure 1A:
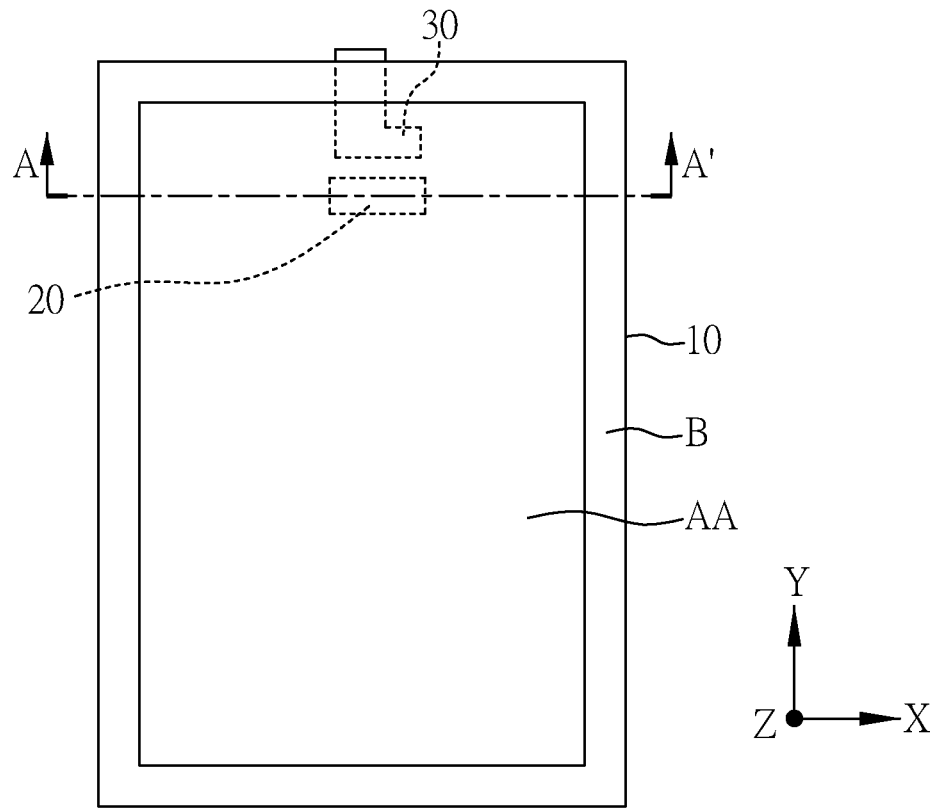
FIG. 1(A) is a top view of the display device according to one embodiment of the present disclosure.

FIG. 1(A) is a top view of the display device 1 according to one embodiment of the present disclosure. As shown in FIG. 1(A), the display device 1 includes a display panel 10 and a vibrator 20. The display panel 10 has a display region (AA) and a non-display region (B). In this embodiment, the displaying surface of the display panel 10 is defined as facing along the Z-direction (i.e. the Z-direction is defined as the normal direction of the display panel 10). The vibrator 20 is disposed on the back surface (i.e. the opposite surface of the displaying surface) of the display panel 10. In another embodiment, the display device 1 may be a flexible or curved display device, but it is not limited thereto. In case the display device 1 is flexible or curved, the displaying surface is defined to be the illuminating surface of the curved display panel 10, and the vibrator 20 is correspondingly disposed on the back surface (i.e. the non-illuminating surface) of the curved display panel 10. In another embodiment, the display panel 10 may be rectangular, non-rectangular, circular, polygonal, or free shape, but it is not limited thereto. The following embodiments are described exemplarily with a non-curved display panel 10, but it is not limited thereto.

Figure 1B:
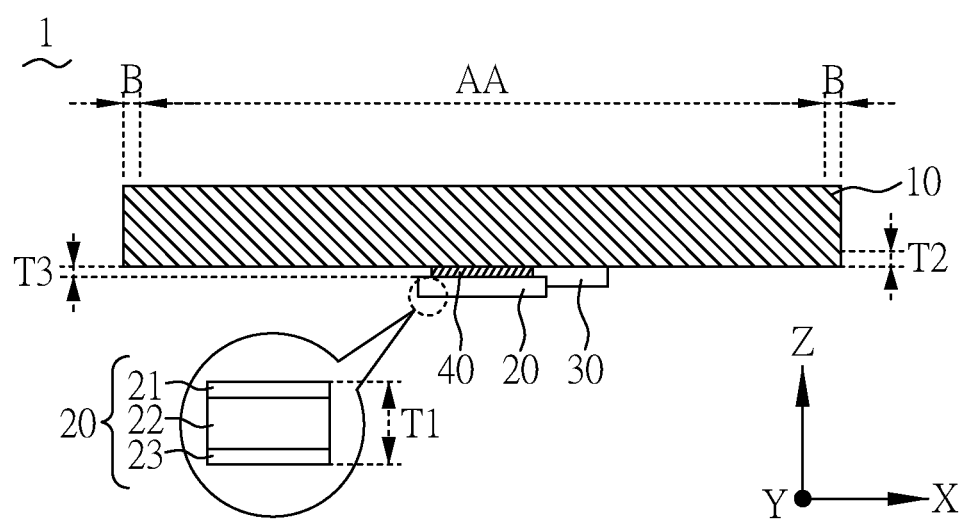
FIG. 1(B) is a sectional view of the display device taken along line A-A' according to one embodiment of FIG. 1(A)

FIG. 1(B) is a sectional view of the display device 1 according to the embodiment of FIG. 1(A). The sectional plane thereof is taken along the line A-A' across the display panel 10 and the vibrator 20. The first sectional plane is perpendicular to the normal direction of the display panel 10 (i.e. the first sectional plane is in the XZ-plane). As shown in FIG. 1(B), the vibrator 20 is disposed at the bottom of the display panel 10. In one embodiment, the display device 1 further includes an adhesive layer 40 disposed between the display panel 10 and the vibrator 20, so that the vibrator 20 is connected with the bottom of the display panel 10 by the adhesive layer 40. In one embodiment, the adhesive layer 40 has at least one part contacting the display panel 10; for example, the adhesive layer 40 has an upper layer (along the Z-direction) contacting the bottom (along the Z-direction) of the display panel 10, but it is not limited thereto. In one embodiment, the adhesive layer 40 has at least one part contacting the vibrator 20; for example, the adhesive layer 40 has a lower layer (along the Z-direction) contacting the top (along the Z-direction) of the vibrator 20, but it is not limited thereto. In one embodiment, the material of the adhesive layer 40 may be any adhesive material such as resin, super glue, cyanoacrylate adhesive, EVA adhesive, UV-curing adhesive, hot-melt adhesive, pressure-sensitive adhesive and so on, but it is not limited thereto in the present disclosure. The adhesive materials capable of fixing the vibrator 20 at the bottom of the display panel 10 all belong to the scope of the present disclosure. In one embodiment, the thickness (T3) of the adhesive layer 40 from the bottom of the display panel 10 and along the normal direction may be 10 micrometers (um) to 50 micrometers (um), but it is not limited thereto.

Referring to FIGS. 1(A) and 1(B), in one embodiment, the location of the vibrator 20 overlaps the display region (AA) from the top of the displaying surface of the display panel 10; i.e., the vibrator 20 is located at the display region (AA) along the normal direction of the display panel 10, but it is not limited thereto. Besides, the term "overlap" hereinafter means partially or wholly overlapping. In another embodiment, the vibrator 20 does not overlap the display region (AA). In one embodiment, because the vibrator 20 overlaps the display region (AA), the display region (AA) has a larger area on the display device 1, thereby increasing the screen-to-body ratio of the display device 1.

Besides, in one embodiment, the display device 1 further includes a circuit board, which may be, for example, a flexible printed circuit (FPC) or a rigid printed circuit board (RPC). The following embodiments are exemplarily described with a flexible circuit board 30, but it is not limited thereto in the present disclosure. In one embodiment, the display panel 10 has at least one part electrically connected with the flexible circuit board 30. For example, in case the flexible circuit board 30 has a timing controller (not shown), the pixel array on the display region (AA) of the display panel 10 is electrically connected with the flexible circuit board 30, or the flexible circuit board 30 is electrically connected with the scan driver or the data driver (not shown) on the non-display region (B) of the display panel 10, so as to control the scan timing or the data timing of the display panel 10, but it is not limited thereto. However, in another embodiment, in case that the display panel 10 is assembled with a touch panel (not shown), known as "out-cell touch", the flexible circuit board 30 is electrically connected with the touch panel, but it is not limited thereto. In still another embodiment, the circuit of the touch panel is integrated into the TFT substrate of the display panel 10, known as "in-cell touch", or the circuit of the touch panel is integrated into the CF substrate of the display panel 10, known as "on-cell touch", wherein the flexible circuit board 30 is electrically connected with the display panel 10. In other words, in the aforementioned embodiments, the flexible circuit board 30 is electrically connected with both of the display panel 10 and touch panel, or only the display panel 10, or only the touch panel, but it is not limited thereto in the present disclosure. In addition, in one embodiment, the flexible circuit board 30 is a flexible structure, which is flexible for assembly requirements. For example, the flexible circuit board 30 has at least one part which can be bent to the bottom of the display panel 10, and thus is adjacent to the vibrator 20, but it is not limited thereto. In one embodiment, the flexible circuit board 30 is electrically connected with the vibrator 20, but it is not limited thereto. It is noted that, even if the flexible circuit board 30 of FIG. 1(A) is connected with the top of the display panel 10 and partially bent to the back surface (in the inverse direction of the Z-direction) of the display panel 10, in practice, the flexible circuit board 30 is connected with a different position of the display panel 10. For example, it is disposed so as to be connected with the right, the bottom or the left of the display panel 10. In addition, the size, the shape or the bending form of the flexible circuit board 30 are not limited.

Besides, as shown in FIG. 1(B), in one embodiment, the vibrator 20 has a first electrode plate 21, a piezoelectric material 22 and a second electrode plate 23. In one embodiment, the piezoelectric material 22 is disposed between the first electrode plate 21 and the second electrode plate 23, but it is not limited thereto. In one embodiment, when current is applied to the vibrator 20, the piezoelectric material 22 performs deformation (for example, extension or contraction) due to the piezoelectric effect, thereby vibrating the display panel 10 and producing acoustic vibration, but it is not limited thereto. In one embodiment, the piezoelectric material 22 is a piezoelectric ceramic material (PZT), but it is not limited thereto. In one embodiment, the piezoelectric material 22 is a polyvinylidene fluoride film (PVDF), but it is not limited thereto. In one embodiment, the piezoelectric material 22 may be any material which can provide the piezoelectric effect.

Figure 1C:
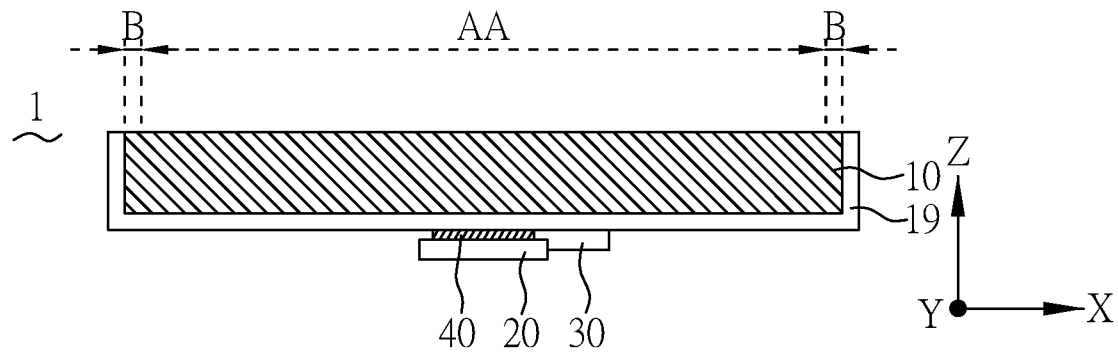
FIG. 1(C) is a sectional view of the display device taken along line A-A' according to another embodiment of FIG. 1(A)

FIG. 1(C) is a sectional view of the display device 1 according to another embodiment of FIG. 1(A). In this embodiment, the display panel 10 further includes a frame 19 disposed at the bottom (i.e. the opposite surface of the displaying surface) of the display panel 10. In one embodiment, the frame 19 is made of metal material such as iron, aluminum, composite metal, and so on, but it is not limited thereto. In another embodiment, the frame 19 is made of non-metal material such as plastics, acrylic, composite plastics, or the combinations thereof. In still another embodiment, the frame 19 is a mixture of metal material and non-metal material, but it is not limited thereto. The materials capable of supporting or protecting the display panel 10 all belong to the scope of the present disclosure. In this embodiment, the adhesive layer 40 is disposed between the frame 19 and the vibrator 20; i.e., the vibrator 20 is connected with the frame 19 by the adhesive layer 40, but it is not limited thereto. In one embodiment, the vibrator 20 has a first thickness (T1) on the first sectional plane (in the XZ-plane), and the frame 19 has a second thickness (T2) (for example, the thickness of the frame 19 from its side to its bottom) on the first sectional plane. In one embodiment, the first thickness (T1) is larger than or equal to 50% of the second thickness (T2), i.e. $0.5 \leq (T1/T2)$, but it is not limited thereto. In one embodiment, the first thickness (T1) is smaller than or equal to 70% of the second thickness (T2), i.e. $(T1/T2) \leq 0.7$, but it is not limited thereto. In one embodiment, the ratio of the first thickness T1 to the second thickness T2 is larger than or equal to 50% and smaller than or equal to 70%, i.e. $0.5 \leq (T1/T2) \leq 0.7$, but it is not limited thereto.

The sizes, the shapes and the locations of the display panel 10, the display region (AA), the non-display region (B), the vibrator 20, the frame 19 or the adhesive layer 40 in the aforementioned description is for illustrative purpose only and is not intended to be limiting of the disclosure, and the following description will describe them in detail.

The following description will depict the detailed structures in case the display panel 10 being a liquid crystal panel, a quantum dot display, an organic light emitting diode panel, a light emitting diode panel or a mini/micro light emitting diode panel, with reference to FIGS. 1(A) to 2(C), but it is not limited thereto. In another embodiment, it also could be used the above a plurality of display panels 10 to construct a tiled display device.

Figure 2A:
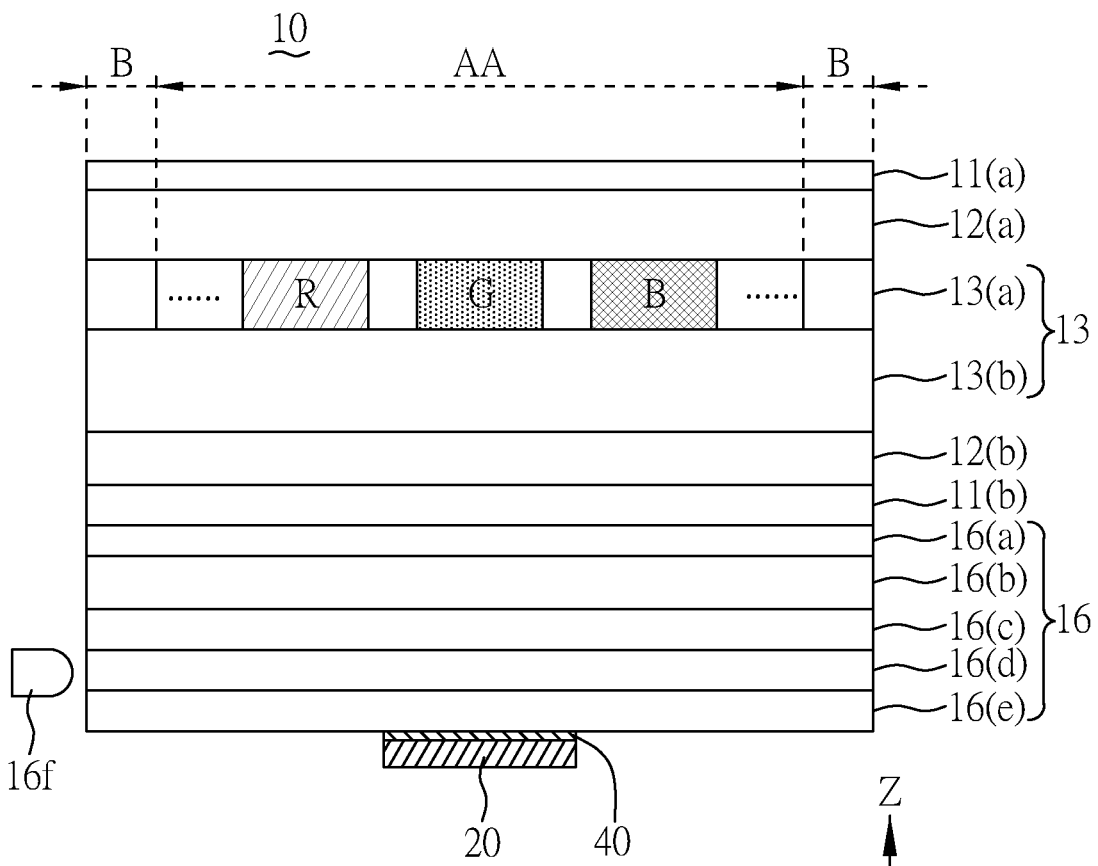
FIG. 2(A) is a sectional view of the display panel according to one embodiment of the present disclosure.

FIG. 2(A) is a sectional view of the display panel 10 according to one embodiment of the present disclosure. The direction of the sectional plane thereof is defined in the same way for FIG. 1(B). In order to clearly show the details of the display panel 10, the flexible circuit board 30 is not shown in FIG. 2(A), but in practice, the display panel 10 in this embodiment is connected with the flexible circuit board 30. As shown in FIG. 2(A), the display panel 10 includes a liquid crystal pixel unit 13. The structure of the liquid crystal pixel unit 13 includes a color filter 13(a) and a liquid crystal layer 13(b). In this embodiment, the color filter 13(a) includes various color layers such as a red color layer (R), a blue color layer (B) and a green color layer (G) as well as a shading region (not shown) disposed at the corresponding location between any two color layers, but it is not limited thereto. In this embodiment, the liquid crystal layer 13(b) includes elements such as liquid crystals, transparent electrodes (formed of ITO or IZO, for example), a passivation layer, alignment layer (formed of polyimide (PI), for example), and so on, which form a pixel array, but it is not limited thereto. Besides, in one embodiment, the display panel 10 further includes an upper substrate 12(a) and a lower substrate 12(b), and the liquid crystal pixel unit 13 is disposed between the upper substrate 12(a) and the lower substrate 12(b), but it is not limited thereto. In one embodiment, the display panel 10 further includes an upper polarizer plate 11(a) and a lower polarizer plate 11(b), and the liquid crystal pixel unit 13, the upper substrate 12(a) and the lower substrate 12(b) are disposed between the upper polarizer plate 11(a) and the lower polarizer plate 11(b), but it is not limited thereto. In one embodiment, the display panel 10 further includes a backlight module 16 disposed below the lower polarizer plate 11(b), but it is not limited thereto. In one embodiment, the backlight module 16 includes an upper diffusion plate 16(a), a prism film 16(b), a lower diffusion plate 16(c), a light guide plate 16(d) and a reflective film 16(e), wherein the light guide plate 16(d) is disposed above (in the Z-direction) the reflective film 16(e), the lower diffusion plate 16(c) is disposed above the light guide plate 16(d), and the prism film 16(b) is disposed between the upper diffusion plate 16(a) and the lower diffusion plate 16(c), but it is not limited thereto, and the backlight module 16 may have other implementations. In one embodiment, the backlight module 16 further includes a light source 16(f), for example a light emitting diode, to produce light, but it is not limited thereto. It is noted that, the elements included in the aforementioned display panel 10 are for illustrative purpose only and is not intended to be limiting of the disclosure. In practice, the display panel 10 may include more or less elements, and it is not necessary to include all of the aforementioned elements. The elements may have various detailed structures and arrangements. In other words, various implementations of the liquid crystal unit, the substrate, the polarizer plate, the light emitting unit all belong to the scope of the present disclosure.

In this embodiment, the vibrator 20 is connected with the bottom of the backlight module 16 by the adhesive layer 40. When the vibrator 20 vibrates, the display panel 10 will vibrate with it, but it is not limited thereto. In another embodiment, the bottom of the backlight module 16 may be further disposed with a frame 19, and the vibrator 20 is thus connected with the frame 19 by the adhesive layer 40, but it is not limited thereto.

Figure 2B:
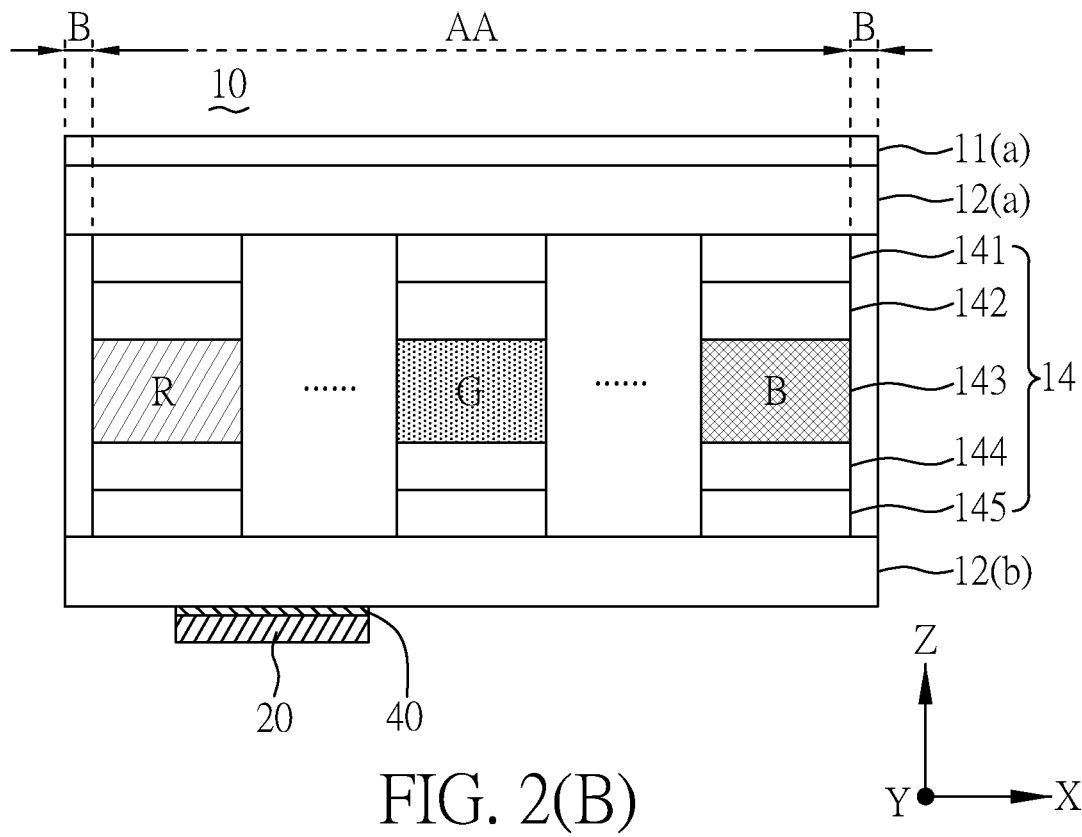
FIG. 2(B) is a sectional view of the display panel according to another embodiment of the present disclosure.

FIG. 2(B) is a sectional view of the display panel 10 according to another embodiment of the present disclosure. The direction of the sectional plane is defined in the same way for FIG. 1(B). In order to clearly show the details of the display panel 10, FIG. 2(B) does not show the flexible circuit board 30. As shown in FIG. 2(B), the display panel 10 includes a light emitting diode layer 14, which may be an organic light emitting layer or a quantum dot light emitting layer, but it is not limited thereto. In this embodiment, the light emitting diode layer 14 includes a red light emitting diode, a blue light emitting diode and a green light emitting diode, but it is not limited thereto. In this embodiment, each light emitting diode includes an upper electrode 141, a hole injection layer 142, at least one light emitting layer 143, an electron injection layer 144 and a lower electrode 145. The light emitting layer 143 is disposed between the hole injection layer 142 and the electron injection layer 144. The hole injection layer 142 and the electron injection layer 144 are disposed between the upper electrode 141 and the lower electrode 145, but it is not limited thereto. In another embodiment, a hole transmission layer (not shown) is further provided between the hole injection layer 142 and the light emitting layer 143, and an electron transmission layer (not shown) is further provided between the light emitting layer 143 and the electron injection layer 144, but it is not limited thereto. In one embodiment, the display panel 10 further includes an upper substrate 12(a) and a lower substrate 12(b), wherein the light emitting diode layer 14 is disposed between the upper substrate 12(a) and the lower substrate 12(b), but it is not limited thereto. In one embodiment, the display panel 10 further includes an upper polarizer plate 11(a) disposed above (in the Z-direction) the upper substrate 12(a), but it is not limited thereto. The upper polarizer plate 11(a) may also be a circular polarizer plate, but it is not limited thereto. It is noted that, the aforementioned elements included in the display panel 10 are for illustrative purpose only and is not intended to be limiting of the disclosure. In practice, the display panel 10 may include more or less elements, and it is not necessary to include all aforementioned elements. The elements may have various detailed structures and arrangements. In other words, various implementations of the light emitting diode layer, the substrate and the polarizer plate all belong to the scope of the present disclosure. In this embodiment, the vibrator 20 is disposed at the bottom (in the inverse direction of the Z-direction) of the lower substrate 12(b) by the adhesive layer 40. When the vibrator 20 vibrates, the display panel 10 will vibrate with it, but it is not limited to the example(s). In another embodiment, the bottom of the lower substrate 12(b) may further be disposed with a frame 19, and instead, the vibrator 20 is connected with the frame 19 by the adhesive layer 40, while it is not limited to the example(s).

Figure 2C:
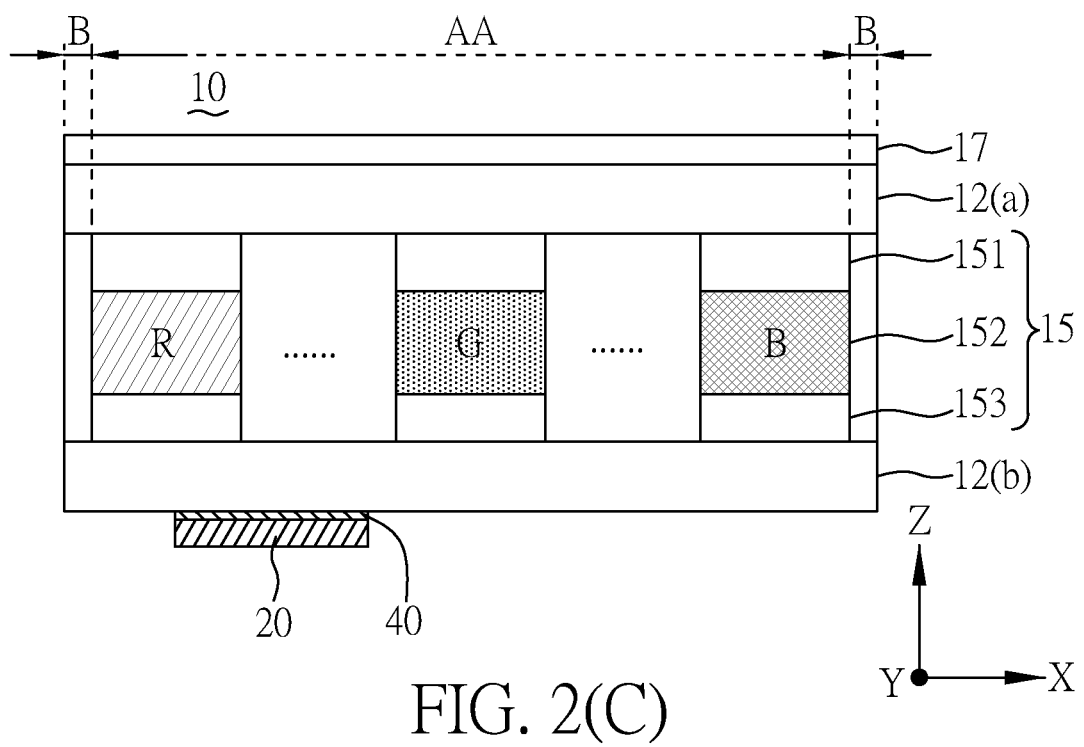
FIG. 2(C) is a sectional view of the display panel according to still another embodiment of the present disclosure.

FIG. 2(C) is a sectional view of the display panel 10 according to another embodiment of the present disclosure. The direction of the sectional plane is defined in the same way for FIG. 1(B). In order to clearly show the details of the display panel 10, FIG. 2(C) does not show the flexible circuit board 30. As shown in FIG. 2(C), the display panel 10 includes a light emitting diode layer 15. In this embodiment, the light emitting diode layer 15 includes light emitting diodes, for example, a red light emitting diode, a blue light emitting diode and a green light emitting diode, but it is not limited thereto. The light emitting diode may be mini LED or micro LED, but it is not limited thereto. In this embodiment, each micro LED includes at least one light emitting layer 152. Each light emitting layer 152 is disposed between an upper electrode 151 and a lower electrode 153, but it is not limited thereto. In one embodiment, the display panel 10 further includes an upper substrate 12(a) and a lower substrate 12(b), wherein the light emitting diode layer 15 is disposed between the upper substrate 12(a) and the lower substrate 12(b), but it is not limited thereto. In one embodiment, the display panel 10 further includes an anti-glare film 17 disposed above (in the Z-direction) the upper substrate 12(a), but it is not limited thereto. It is noted that, the elements included in the aforementioned display panel 10 are for illustrative purpose only and are not intended to be limiting of the disclosure. In practice, the display panel 10 may include more or less elements, and it is not necessary to include all aforementioned elements. The elements may have various detailed structures and arrangements. In other words, various implementations of the light emitting diode layer, the substrate and the film all belong to the scope of the present disclosure. In this embodiment, the vibrator 20 is disposed at the bottom (in the inverse direction of the Z-direction) of the lower substrate 12(b) by the adhesive layer 40. When the vibrator 20 vibrates, the display panel 10 will vibrate with it, but it is not limited thereto. In another embodiment, the bottom of the lower substrate 12(b) is further disposed with a frame 19, and the vibrator 20 is thus connected with the frame 19 by the adhesive layer 40, but it is not limited thereto.

The following description will describe the relative positions of the vibrator 20, the flexible circuit board 30 and the bottom of the display panel 10, referring to FIGS. 1(A) to 3(D). FIGS. 3(A) to 3(D) are top views of the display panel 10 according to different embodiments of the present disclosure. The display panel 10 is arranged in the XY-plane, and the displaying surface of the display panel 10 is perpendicular to the Z-direction. Besides, in the embodiment of FIGS. 3(A) to 3(D), the flexible circuit board 30 is bent to the bottom of the display panel 10, but it is not limited thereto in the present disclosure. Besides, for clarity, FIGS. 3(A) to 3(D) do not show the frame 19, but in practice, the bottom of the display panel 10 may have the frame 19.

Figure 3A:
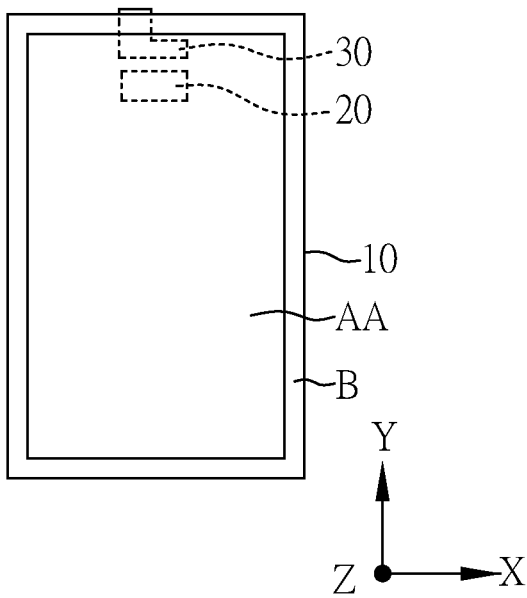
FIG. 3(A) is a top view of the display panel according to one embodiment of the present disclosure.

FIG. 3(A) is a top view of the display panel 10 according to one embodiment of the present disclosure. In this embodiment, the bottom of the display panel 10 is disposed with a vibrator 20, and the vibrator 20 may be rectangular (with at least one long side and at least one short side), square, circular, polygonal or free shape. The vibrator 20 in the following embodiment is described exemplarily with a rectangular shape, but it is not limited thereto in the present disclosure. In this embodiment, the vibrator 20 is disposed adjacent to the top (in the Y-direction) and center (in the X-direction) of the display panel 10, and the long side of the vibrator 20 is disposed along the X-direction and the short side of the vibrator 20 is disposed along the Y-direction, but it is not limited thereto. Besides, the flexible circuit board 30 bent to the bottom of the display panel 10 is located at the top of the display panel 10 (in the Y-direction), and adjacent to the long side of the vibrator 20, but it is not limited thereto. In this embodiment, the location of the vibrator 20 does not overlap the location of the flexible circuit board 30 in view from the Z-direction of the display panel 10. In another embodiment, the location of the vibrator 20 partially or wholly overlaps the flexible circuit board 30. Besides, in this embodiment, the vibrator 20 wholly overlaps the display region (AA) of the display panel 10 in view from the Z-direction of the display panel 10, but it is not limited thereto.

Figure 3B:
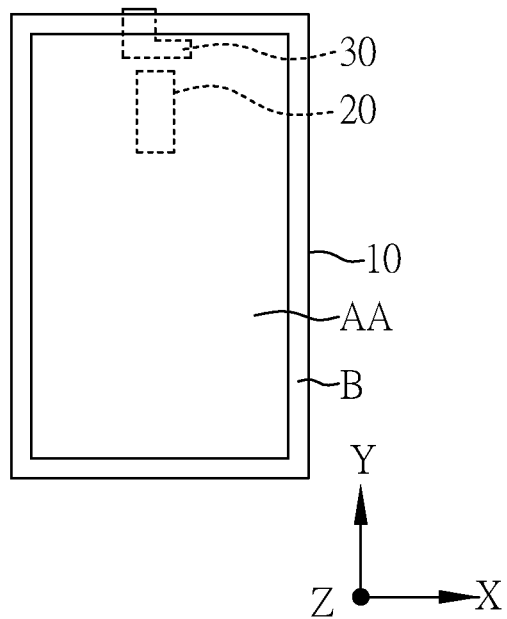
FIG. 3(B) is a top view of the display panel according to another embodiment of the present disclosure.

FIG. 3(B) is a top view of the display panel 10 according to another embodiment of the present disclosure. In this embodiment, the bottom of the display panel 10 is disposed with a vibrator 20, and the vibrator 20 has at least one long side and at least one short side. In this embodiment, the vibrator 20 is disposed adjacent to the top (in the Y-direction) and the center (in the X-direction) of the display panel 10, and the short side of the vibrator 20 is disposed along the X-direction and the long side of the vibrator 20 is disposed along the Y-direction, but it is not limited thereto. Besides, the flexible circuit board 30 bent to the bottom of the display panel 10 is located at the top (in the Y-direction) of the display panel 10, and adjacent to the short side of the vibrator 20. In another embodiment, the location of the vibrator 20 does not overlap the location of the flexible circuit board 30, but it is not limited thereto. In other embodiments, the location of the vibrator 20 partially or wholly overlaps the flexible circuit board 30. Besides, in this embodiment, the vibrator 20 wholly overlaps the display region (AA) of the display panel 10 in view from the Z-direction of the display panel 10, but it is not limited thereto.

Figure 3C:
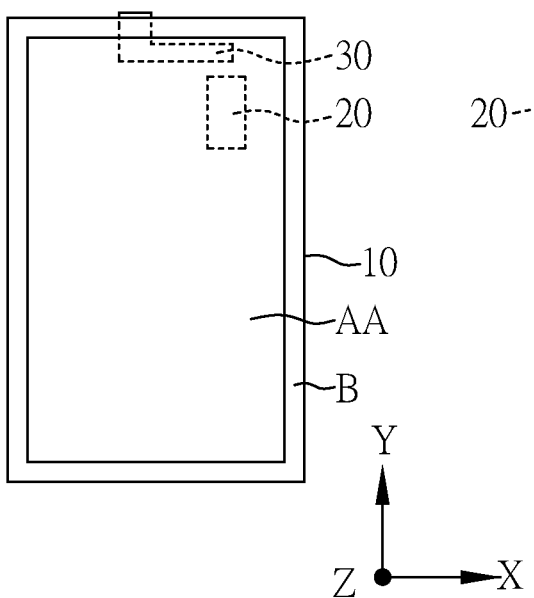
FIG. 3(C) is a top view of the display panel according to still another embodiment of the present disclosure.

FIG. 3(C) is a top view of the display panel 10 according to still another embodiment of the present disclosure. In this embodiment, the bottom of the display panel 10 is disposed with a vibrator 20, and the vibrator 20 has at least one long side and at least one short side. In this embodiment, the vibrator 20 is disposed adjacent to the top (in the Y-direction) of the display panel 10 and shifted to the side (in the X-direction) of the display panel 10, and the short side of the vibrator 20 is disposed along the X-direction and the long side of the vibrator 20 is disposed along the Y-direction, but it is not limited thereto. Besides, the flexible circuit board 30 bent to the bottom of the display panel 10 is located at the top (in the Y-direction) of the display panel 10, and adjacent to the short side of the vibrator 20, but it is not limited thereto. In one embodiment, the location of the vibrator 20 does not overlap the location of the flexible circuit board 30. In another embodiment, the location of the vibrator 20 partially or wholly overlaps the flexible circuit board 30. Besides, in this embodiment, the vibrator 20 wholly overlaps the display region (AA) of the display panel 10 in view from the Z-direction of the display panel 10, but it is not limited thereto.

Figure 3D:
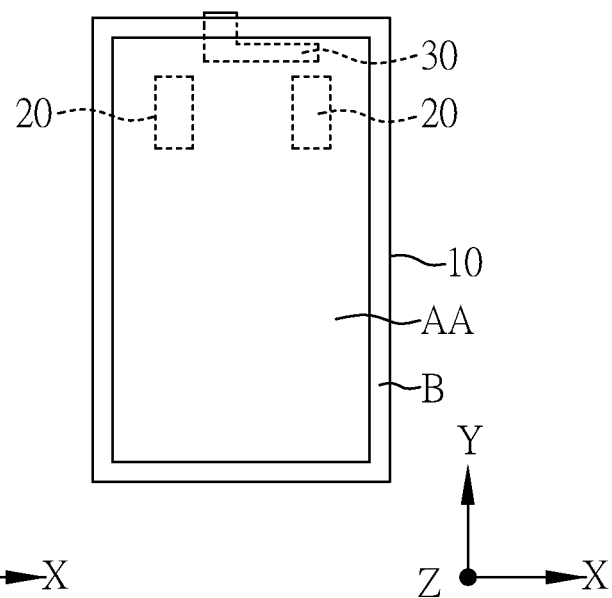
FIG. 3(D) is a top view of the display panel according to yet another embodiment of the present disclosure.

FIG. 3(D) is a top view of the display panel 10 according to yet another embodiment of the present disclosure. In this embodiment, the display panel 10 is disposed with a plurality of vibrators 20, each having at least one long side and at least one short side. In this embodiment, each of the (for example, two) vibrators 20 is disposed adjacent to the top (in the Y-direction) of the display panel 10 and shifted to the two sides (in the X-direction) of the display panel 10, and the short sides of the vibrators 20 are disposed along the X-direction and the long sides of the vibrators 20 are disposed along the Y-direction, but it is not limited thereto. Besides, the flexible circuit board 30 bent to the bottom of the display panel 10 is located at the top (in the Y-direction) of the display panel 10, and adjacent to the short sides of the vibrators 20, but it is not limited thereto. In one embodiment, the locations of the vibrators 20 do not overlap the location of the flexible circuit board 30. In another embodiment, the locations of the vibrators 20 partially or wholly overlap the location of the flexible circuit board 30. Besides, in this embodiment, the vibrator 20 wholly overlaps the display region (AA) of the display panel 10 in view from the Z-direction of the display panel 10, but it is not limited thereto.

The description about the display panel 10, the vibrator 20 or the flexible circuit board 30 in the aforementioned embodiments is for illustrative purpose only exemplary and is not intended to be limiting of the disclosure. The present disclosure may have more different implementations. For example, in case that the display panel 10 and the vibrator 20 are both either non-rectangular or non-square, the vibrator 20 may be simply disposed adjacent to the top (in the Y-direction) of the display panel 10. There is no special limitation to the relative locations, the sizes, the shapes or the alignments for the display panel 10 and the vibrator 20. The designs which allow the user to receive the vibrating acoustic signal produced by the display panel 10 and the vibrator 20 all belong to the scope of the present disclosure.

The following description will depict the size ratio of the vibrator 20 and the display panel 10, referring to FIGS. 1(A) to 4(B). FIGS. 4(A) and 4(B) are top views of the display panel 10 according to different embodiments of the present disclosure. The vibrator 20 is located at the bottom (the opposite surface of the displaying surface) of the display panel 10. For clarity, FIGS. 4(A) and 4(B) do not show the flexible circuit board 30 and the frame 19, but in practice, the display panel 10 may be connected with the flexible circuit board 30, or the display panel 10 may have the frame 19.

FIG. 4(A) is a top view of the display panel 10 according to one embodiment of the present disclosure. In this embodiment, the bottom of the display panel 10 is disposed with a vibrator 20, and the vibrator 20 overlaps the display region (AA) of the display panel 10, but it is not limited thereto. As shown in FIG. 4(A), the vibrator 20 has a first area (area1) in the XY-plane, and the display region (AA) has a second area (area2) in the XY-plane. In one embodiment, the ratio of the first area (area1) to the second area (area2) is larger than or equal to 5% (i.e. $0.05 \leq (area1/area2)$), but it is not limited thereto. FIG. 4(B) is a top view of the display panel 10 according to another embodiment of the present disclosure. In this embodiment, the bottom of the display panel 10 is disposed with a vibrator 20, and the vibrator 20 overlaps the display region (AA) of the display panel 10, but it is not limited thereto. As shown in FIG. 4(B), the vibrator 20 has a first area (area1) in the XY-plane, and the display region (AA) has a second area (area2) in the XY-plane. In this embodiment, the ratio of the first area (area1) to the second area (area2) is smaller than or equal to 70% (i.e. $(area1/area2) \leq 0.7$), but it is not limited thereto. In addition, in still another embodiment, the vibrator 20 has a first area (area1) in the XY-plane, the display region (AA) has a second area (area2) in the XY-plane, and the ratio of the first area (area1) to the second area (area2) is larger than or equal to 5% and smaller than or equal to 70% (i.e. $0.05 \leq (area1/area2) \leq 0.7$), but it is not limited thereto. In another embodiment, it is also possible to use the aforementioned ratio of FIGS. 4(A) to 4(B) for the ratio of the areas that are projections of the vibrator 20 and the display region (AA) of the display panel 10 respectively on the XY-plane in case that the display region (AA) of the display panel 10 and the vibrator 20 are both non-rectangular (not shown), but it is not limited thereto.

The description of the display panel 10, the display region (AA) or the vibrator 20 in the aforementioned embodiment is for illustrative purpose only and is not intended to be limiting of the disclosure, and the present disclosure may have more different implementations.

Figure 5B:
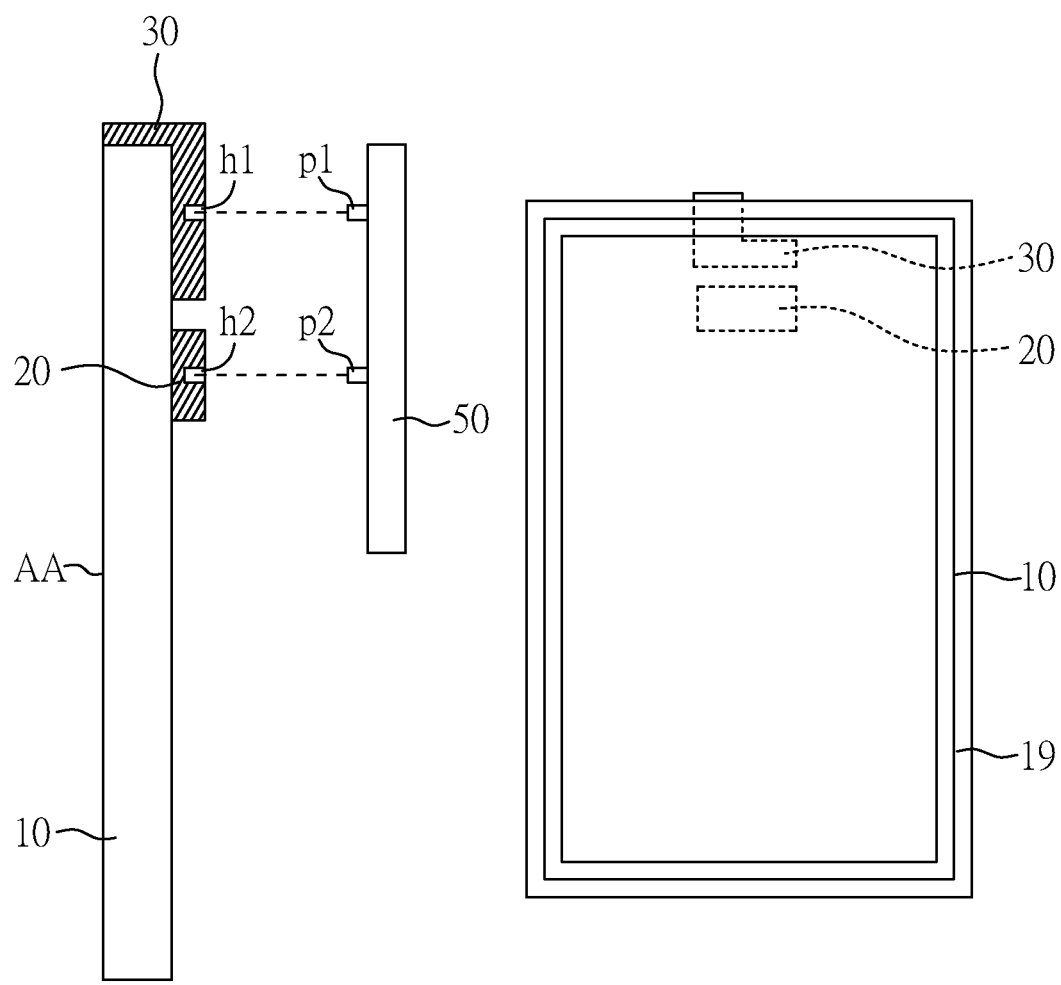
FIG. 5(B) is a schematic view of the display device and the control motherboard according to another embodiment of the present disclosure.
Figure 5B:
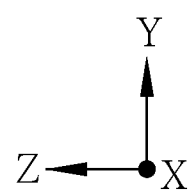
Figure 5C:
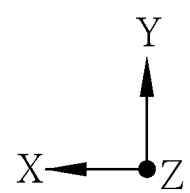
FIG. 5(C) is a top view of the display device according to one embodiment of the present disclosure.

Besides, in this embodiment, the display device 1 (or its display panel 10) may be assembled with a control motherboard 50, which controls the display device 1, but it is not limited thereto. The following description will depict the assembly of the display device 1 and the control motherboard 50, referring to FIGS. 1(A) to 5(C). FIGS. 5(A) to 5(C) are schematic views of the assembly of the display device 1 and the control motherboard 50 according to different embodiments of the present disclosure.

FIG. 5(A) is a schematic view of the display device 1 and the control motherboard 50 according to one embodiment of the present disclosure. For clarity, FIG. 5(A) does not show the frame 19, but in practice, the display panel 10 of the display device 1 may have the frame 19. Besides, in this embodiment, the display device 1 is defined in the XY-plane, the displaying surface of the display panel 10 is defined as facing along Z-direction, and the flexible circuit board 30 is bent to the bottom of the display panel 10 (i.e. the opposite surface of the displaying surface), but it is not limited thereto. As shown in FIG. 5(A), the part of the flexible circuit board 30 which is bent to the bottom of the display panel 10 has a first soldering point (S1), the vibrator 20 has a second soldering point (S2), and the control motherboard 50 has a third soldering point (S3) corresponding to the first soldering point (S1) and a fourth soldering point (S4) corresponding to the second soldering point (S2). The soldering points are correspondingly soldered; for example, the first soldering point (S1) is soldered with the third soldering point (S3), and the second soldering point (S2) is soldered with the fourth soldering point (S4), so that the control motherboard 50 can be connected with the vibrator 20 and the flexible circuit board 30. In this embodiment, the vibrator 20 does not overlap the flexible circuit board 30. In another embodiment, the vibrator 20 partially or wholly overlaps the flexible circuit board 30. The embodiment of FIG. 5(A) is for illustrative purpose only and is not intended to be limiting of the disclosure.

FIG. 5(B) is a schematic view of the display device 1 and the control motherboard 50 according to another embodiment of the present disclosure. For clarity, FIG. 5(B) does not show the frame 19, but in practice, the display panel 10 of the display device 1 may have the frame 19. Besides, in this embodiment, the display device 1 is defined in the XY-plane, the displaying surface of the display panel 10 is defined as facing along Z-direction, and the flexible circuit board 30 is bent to the bottom of the display panel 10 (i.e. the opposite surface of the displaying surface), but it is not limited thereto. In addition, for clarify, FIG. 5(B) shows the side view of the display device 1. As shown in FIG. 5(B), the part of the flexible circuit board 30 which is bent to the bottom of the display panel 10 has a first thimble hole (h1), the vibrator 20 has a second thimble hole (h2), and the control motherboard 50 has a first thimble (p1) and a second thimble (p2), wherein the first thimble (p1) is disposed corresponding to the first thimble hole (h1), and the second thimble (p2) is disposed corresponding to the second thimble hole (h2). When assembling the control motherboard 50 and the display device 1, the first thimble (p1) is inserted correspondingly into the first thimble hole (h1), and the second thimble (p1) is inserted correspondingly into the second thimble hole (h2), so that the control motherboard 50 can be connected with the vibrator 20 and the flexible circuit board 30, but it is not limited thereto. In this embodiment, the vibrator 20 does not overlap the flexible circuit board 30. In another embodiment, the vibrator 20 partially or wholly overlaps the flexible circuit board 30, for example but not limited to the case that they share a thimble hole. The embodiment of FIG. 5(B) is for illustrative purpose only and is not intended to be limiting of the disclosure.

FIG. 5(C) is a schematic view of the display device 1 according to one embodiment of the present disclosure. It is noted that there is a frame 19 shown in FIG. 5(C). The vibrator 20 is disposed on the frame 19. In this embodiment, the frame 19 is connected with the vibrator 20, and the frame 19 is made of metal or partially made of metal. Therefore, the frame 19 serves as the ground terminal of the vibrator 20. In other words, in this embodiment, the frame 19 serves as the ground terminal according to the design requirement, but it is not limited thereto. The embodiment of FIG. 5(C) is for illustrative purpose only and is not intended to be limiting of the disclosure.

The following description will depict the adhesion of the adhesive layer 40 and the vibrator 20, referring to FIGS. 1(B), 6(A) and 6(B).

FIG. 6(A) is a schematic view of the adhesive layer 40 and the vibrator 20 according to one embodiment of the present disclosure. The vibrator 20 and the adhesive layer 40 are disposed in the XY-plane. As shown in FIG. 6(A), the adhesive layer 40 is a whole adhesive structure; i.e., the adhesive layer 40 is wholly distributed on one surface of the vibrator 20, so that the surface of the vibrator 20 perpendicular to the Z-direction is wholly adhered to the display panel 10 or the frame 19, but it is not limited thereto.

FIG. 6(B) is a schematic view of the adhesive layer 40 and the vibrator 20 according to another embodiment of the present disclosure. The vibrator 20 and the adhesive layer 40 are disposed in the XY-plane. As shown in FIG. 6(B), the adhesive layer 40 is a partial adhesive structure; i.e., the adhesive layer 40 is partially distributed on one surface of the vibrator 20. For example, the adhesive layer 40 is distributed on the edges of the surface of the vibrator 40, but not distributed on the center of the surface. In this way, the vibrator 20 is connected with the display panel 10 or the frame 19 by the edges, but it is not limited thereto. Besides, the aforementioned partial adhesion is for illustrative purpose only and is not intended to be limiting of the disclosure.

The following description will depict the shapes of the display panel 10, the display region (AA) and the vibrator 20, referring to FIGS. 1(A) to 7(C).

Figures 7A, 7B, 7C:
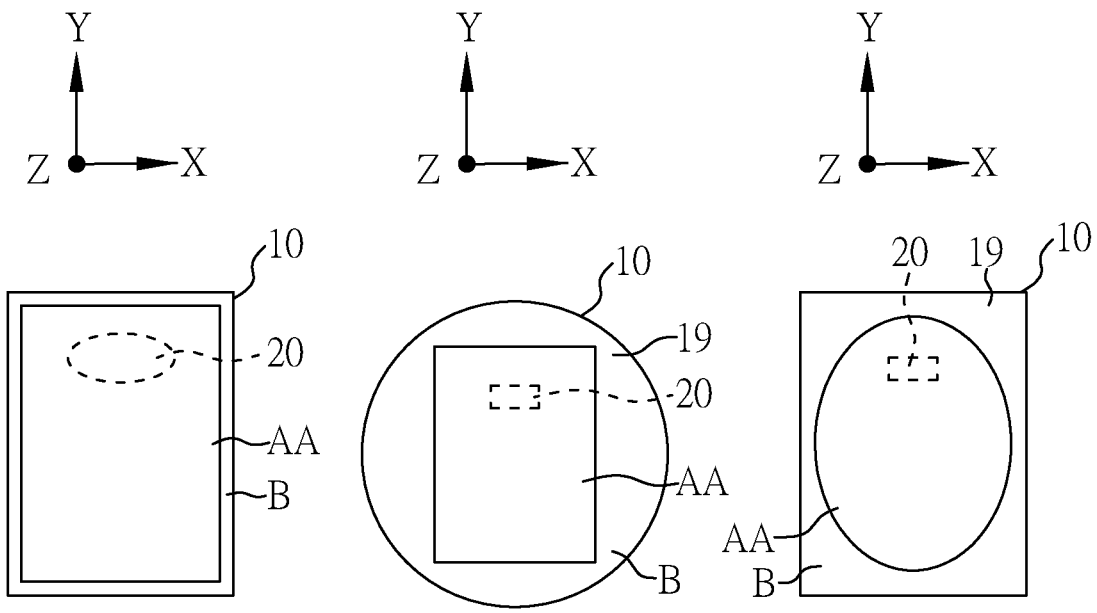
FIG. 7(A) is a top view of the simplified structure of the display device according to one embodiment of the present disclosure.
FIG. 7(B) is a top view of the simplified structure of the display device according to another embodiment of the present disclosure.
FIG. 7(C) is a top view of the simplified structure of the display device according to still another embodiment of the present disclosure.

FIG. 7(A) is a top view of the simplified structure of the display device 1 according to one embodiment of the present disclosure. The display device 1 is disposed in the XY-plane, and the displaying surface of the display panel 10 is perpendicular to the Z-direction. Besides, in order to emphasize the variant details of the elements, FIG. 7(A) only shows the display panel 10, the display region (AA) and the vibrator 20, but in practice, the display device 1 may include more elements. In this embodiment, the shape of the vibrator 20 is different from the shape of the display panel 10 or the shape of the display region (AA). In one embodiment, the shape of the display panel 10 is rectangular, but it is not limited thereto. In one embodiment, the shape of the vibrator 20 is non-rectangular, for example, ellipsoid, but it is not limited thereto. The embodiment of FIG. 7(A) is for illustrative purpose only and is not intended to be limiting of the disclosure.

FIG. 7(B) is a top view of the simplified structure of the display device 1 according to another embodiment of the present disclosure. The display device 1 is disposed in the XY-plane, and the displaying surface of the display panel 10 is perpendicular to the Z-direction. Besides, FIG. 7(B) only shows the display panel 10, the display region (AA) and the vibrator 20, but in practice, the display device 1 may include more elements. In this embodiment, the shape of the display panel 10 is different from the shape of the display region (AA) or the shape of the vibrator 20. In one embodiment, the shape of the display panel 10 is non-rectangular, for example, circular, but it is not limited thereto. In one embodiment, the shape of the display region (AA) is rectangular, but it is not limited thereto. Besides, the shape of the vibrator 20 may be rectangular, but it is not limited thereto. The embodiment of FIG. 7(B) is for illustrative purpose only and is not intended to be limiting of the disclosure.

FIG. 7(C) is a top view of the simplified structure of the display device 1 according to still another embodiment of the present disclosure. The display device 1 is disposed in the XY-plane, and the displaying surface of the display panel 10 is perpendicular to the Z-direction. Besides, FIG. 7(C) only shows the display panel 10, the display region (AA) and the vibrator 20, but in practice, the display device 1 may include more elements. In this embodiment, the shape of the display region (AA) is different from the shape of the display panel 10 or the shape of the vibrator 20. In one embodiment, the shape of the display region (AA) is non-rectangular, for example, ellipsoid, but it is not limited thereto. In one embodiment, the shape of the display panel 10 is rectangular, but it is not limited thereto. In one embodiment, the shape of the vibrator 20 is rectangular, but it is not limited thereto. The embodiment of FIG. 7(C) is for illustrative purpose only and is not intended to be limiting of the disclosure.

The features in the embodiments FIGS. 7(A) to 7(C) may be modified or combined with each other in any way. For example, the display panel 10, the display region (AA) or the vibrator 20 may have different shapes according to application requirement, for example, when the display device 1 is used in mobile phones or watches, which may require different shapes. Besides, the shape of the frame 19 or the adhesive layer 40 may be changed following the change of the shape of the display panel 10, the display region (AA) or the vibrator 20. Similarly, the sizes of the elements may be changed accordingly.

Figure 8:
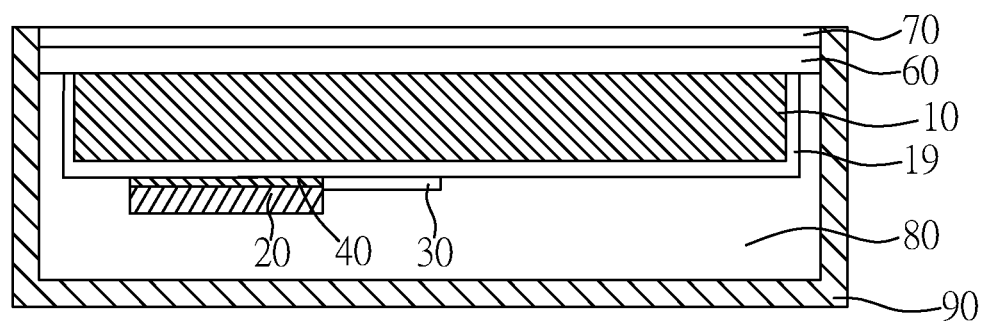
FIG. 8 is a sectional view of the display device according to another embodiment of the present disclosure.

The display device 1 of the present disclosure can be combined with other devices according to different applications. FIG. 8 is a sectional view of the display device 1 according to another embodiment of the present disclosure, wherein the displaying surface of the display panel 10 is perpendicular to the Z-direction, and the sectional plane thereof is defined in the same way for FIG. 1(B). In this embodiment, the display device 1 further includes a touch panel 60 (being out-cell touch) and a glass covering shield 70, wherein the display panel 10 is disposed below the touch panel 60, and the glass covering shield 70 is disposed above the display panel 10 and the touch panel 60 (in the Z-direction), but it is not limited thereto in the present disclosure. In one embodiment, the circuit of the touch panel 60 is integrated into the TFT substrate of the display panel 10 to form an in-cell touch structure, or the circuit of the touch panel 60 is integrated into the CF substrate of the display panel 10 to form an on-cell touch structure, but it is not limited thereto in the present disclosure. Besides, when the display panel 10 is used in some electronic devices, for example, but not limited to mobile phones, smart watches or flat panels, the bottom of the display panel 10 and the vibrator 20 are covered by an intermediary frame 80, and the intermediary frame 80 is further covered by an outer frame 90, but it is not limited thereto. In one embodiment, since the vibrator 20 is disposed on the display panel 10, the acoustic vibration can be concentrated inside the display panel 10, and therefore, there is a lower possibility for the sound to be revealed to the external from the intermediary frame 80 or the outer frame 90, but it is not limited thereto.

Besides, a display device 1 (or the display panel 10 thereof) may also be combined with a pressure sensor 65 and a vibrator 20 to provide the display device 1 with a touch feedback function, but it is not limited thereto. The following description will depict the touch feedback function of the display device 1, with reference to the structural sectional view (taken along the Z-direction).

Figure 9A:
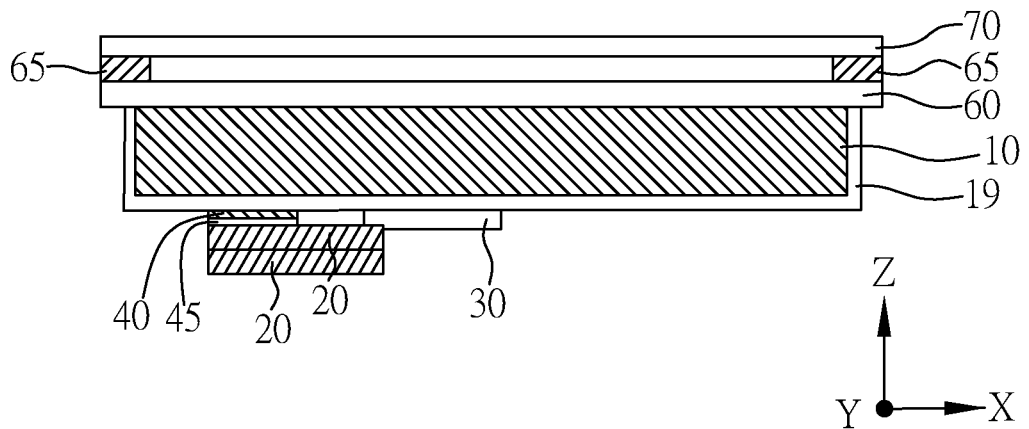
FIG. 9(A) is a sectional view of the display device according to another embodiment of the present disclosure.

FIG. 9(A) is a sectional view of the display device 1 according to another embodiment of the present disclosure, wherein the direction and the structure of the display panel 10 can be referred to the embodiment of FIG. 1(B). In this embodiment, the display device 1 further includes a touch panel 60, a plurality of pressure sensors 65 and a glass covering shield 70. The display panel 10 is disposed below the touch panel 60, the pressure sensors 65 are disposed above the touch panel 60, and the glass covering shield 70 is disposed above the pressure sensors 65. Optionally, the pressure sensors 65 are disposed at four corners of the touch panel 60 (FIG. 9(A) only shows the pressure sensors 65 at two corners), along the four sides of the touch panel 60, or everywhere of the touch panel 60.

The pressure sensors 65 are used to detect the touch pressure; i.e., the pleasure sensors 65 detect the touch pressure signal according to the pressing force from the user, and send it to the vibrator 20, in order to trigger the vibration of the vibrator 20. In this way, the vibrator 20 can provide the user with touch feedback to recognize the effectiveness of his/her touch.

Furthermore, the frame 19 may serve as a resonant cavity for touch feedback in case of the display panel 10 of FIG. 1(C).

Furthermore, the vibrator 20 may determine the amplitude (intensity) of the touch feedback according to the pressing force applied by the user. Besides, in this embodiment, the vibrator 20 has a lower vibrating frequency, larger than or equal to 1 Hz and smaller than or equal to 250 Hz, when it provides the touch feedback function. In comparison, the vibrator 20 has a higher vibrating frequency, larger than or equal to 20 Hz and smaller than or equal to 20 KHz, when it provides the acoustic function to generate a sound.

Figure 9B:
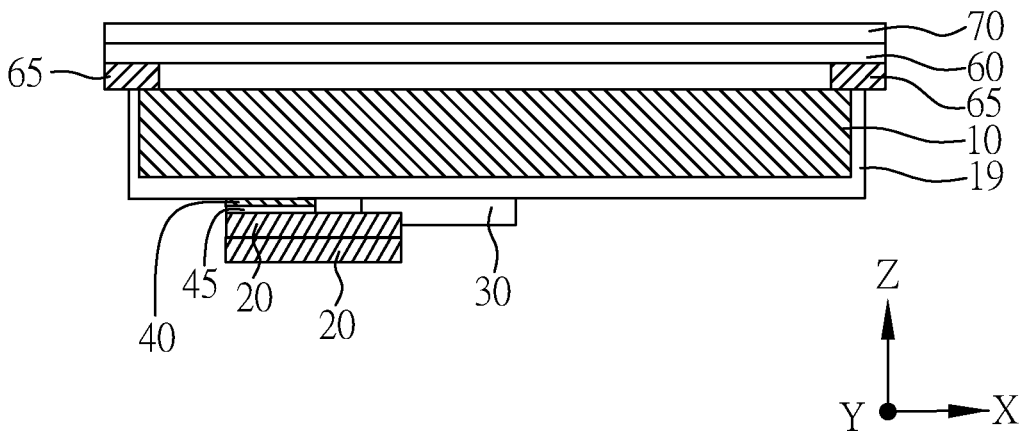
FIG. 9(B) is a sectional view of the display device according to another embodiment of the present disclosure.

FIG. 9(B) is a sectional view of the display device 1 according to another embodiment of the present disclosure. This embodiment is similar to FIG. 9(A) except that, in this embodiment, the pressure sensors 65 are disposed between the touch panel 60 and the display panel 10. Other features may be combined or modified with reference to the embodiment of FIG. 9(A), but it is not limited thereto.

As shown in FIGS. 9(A) and 9(B), a support substrate 45 is further provided between the vibrator 20 and the adhesive layer 40, which improves the touch feedback force of the vibrator 20. The support substrate 45 has at least one part contacting the vibrator 20, and the support substrate 45 is made of a metal material, for example, iron, aluminum, or composite metal material, but it is not limited thereto. In another embodiment, the support substrate 45 is made of a non-metal material, for example, plastics, acrylic or composite plastics material. In still another embodiment, the support substrate 45 is made of a mixture of a metal material and a non-metal material, but it is not limited thereto. As shown in FIGS. 9(A) and 9(B), in order to improve the touch feedback force of the vibrator 20, the vibrator 20 is designed to be a vibrator structure with double layers (or more layers). The thickness of the double-layer vibrator along the Z-direction is larger than or equal to 0.1 mm and smaller than or equal to 5 mm (i e 0.1 mm≤the thickness of the double layer vibrator≤5 mm), but it is not limited thereto. Besides, in one embodiment, the thickness of the support substrate 45 along the Z-direction is larger than or equal to 0.1 mm and smaller than or equal to 2 mm (0.1 mm≤the thickness of the support substrate 45≤2 mm), but it is not limited thereto.

In the present disclosure, the display device or the touch display device according to the aforementioned embodiments may be applicable to any known electronic device that requires a display screen to display an image, such as a display, a mobile phone, a notebook computer, a flat panel computer, a watch, a VR display, a video camera, a cameras, a music player, a mobile navigation device, a television, a vehicle dashboard, a center informative display, an electronic rear-view mirror, a head-up display, and so on.

Accordingly, the present disclosure provides an improved display device 1. With the special combination of the display panel 10 and the vibrator 20, there is no need to reserve a region around the display region (AA) in advance for the vibrator 20, and thus it is easier to achieve the effect of borderless screen for the display device 1. Alternatively, in the present disclosure, the vibration of the vibrator 20 can drive the display device 1 to vibrate, and the acoustic vibration can be concentrated inside the display device 1. In an application of an electronic device, there is a lower possibility for the acoustic signal to be revealed to the external. Moreover, in the present disclosure, the pressure sensor 65, the touch panel 60, the display panel 10 and the vibrator 20 may further be combined to provide the display device 1 with a touch feedback function.

The aforementioned embodiment are examples only for convenience of description, the scope of the present disclosure is claimed hereinafter in the claims and is not limited to the aforementioned embodiments.

What is claimed is:

1. A display device, comprising:
   a display panel, including a substrate and a frame;
   a vibrator, disposed on the frame, wherein a portion of the frame is disposed between the substrate and the vibrator;
   an intermediary frame covering the vibrator and a surface of the display panel;
   an outer frame covering the intermediary frame;
   an adhesive layer, disposed between the frame and the vibrator, wherein a part of the adhesive layer contacts the frame, and another part of the adhesive layer contacts the vibrator, wherein the adhesive layer has an upper layer contacting a bottom of the frame, and a lower layer contacting a top of the vibrator, wherein the vibrator is connected with the frame by the adhesive layer, the vibrator vibrates the display panel to provide tactile feedback when the vibrator vibrates at a frequency larger than or equal to 1 Hz and smaller than or equal to 250 Hz, and the vibrator vibrates the display panel to provide acoustic function and generate sound capable of being concentrated inside the display panel when the vibrator vibrates at a frequency larger than or equal to 20 Hz and smaller than or equal to 20 KHz, and wherein the vibrator has a first thickness, the frame has a second thickness, and a ratio of the first thickness to the second thickness is between 50% to 70%; and
   a touch panel and a glass covering shield, wherein the display panel is disposed below the touch panel and the glass covering shield is disposed above the display panel and the touch panel.

2. The display device as claimed in claim 1, further comprising a flexible circuit board, wherein the flexible circuit board is disposed adjacent to the vibrator, or the flexible circuit board at least partially overlaps the vibrator.

3. The display device as claimed in claim 1, wherein the vibrator has a first electrode plate, a piezoelectric material and a second electrode plate, and the piezoelectric material is disposed between the first electrode plate and the second electrode plate.

4. The display device as claimed in claim 3, wherein the piezoelectric material comprises a piezoelectric ceramic material or a polyvinylidene fluoride film.

5. The display device as claimed in claim 1, wherein the display panel has a display region, the vibrator has a first area, the display region of the display panel has a second area, and a ratio of the first area to the second area is larger than or equal to 5% and smaller than or equal to 50%.

6. The display device as claimed in claim 1, further comprising a plurality of pressure sensors disposed on the display panel.

7. The display device as claimed in claim 6, wherein the pressure sensors are disposed at four corners of the display panel.

8. The display device as claimed in claim 1, wherein the adhesive layer is a partial adhesive structure or a whole adhesive structure.

9. The display device as claimed in claim 1, wherein the display panel has a display region, and the vibrator overlaps the display region.

10. The display device as claimed in claim 1, further comprising a support substrate disposed between the vibrator and the adhesive layer.

11. The display device as claimed in claim 1, wherein the vibrator is a double-layer vibrator having a thickness larger than or equal to 0.1 mm and smaller than or equal to 5 mm.

12. An electronic device, comprising:
    a display panel, including a substrate and a frame;
    a vibrator, disposed on the frame, wherein a portion of the frame is disposed between the substrate and the vibrator;
    an intermediary frame covering the vibrator and a surface of the display panel;
    an outer frame covering the intermediary frame;
    an adhesive layer, disposed between the frame and the vibrator, wherein a part of the adhesive layer contacts the frame, and another part of the adhesive layer contacts the vibrator, wherein the adhesive layer has an upper layer contacting a bottom of the frame, and a lower layer contacting a top of the vibrator, wherein the vibrator is connected with the frame by the adhesive layer, the vibrator vibrates the display panel to provide tactile feedback when the vibrator vibrates at a frequency larger than or equal to 1 Hz and smaller than or equal to 250 Hz, and the vibrator vibrates the display panel to provide acoustic function and generate sound capable of being concentrated inside the display panel when the vibrator vibrates at a frequency larger than or equal to 20 Hz and smaller than or equal to 20 KHz, and wherein the vibrator has a first thickness, the frame has a second thickness, and a ratio of the first thickness to the second thickness is between 50% to 70%; and
    a touch panel and a glass covering shield, wherein the display panel is disposed below the touch panel and the glass covering shield is disposed above the display panel and the touch panel.

13. The electronic device as claimed in claim 12, further comprising a flexible circuit board, wherein the flexible circuit board is disposed adjacent to the vibrator, or the flexible circuit board at least partially overlaps the vibrator.

14. The electronic device as claimed in claim 12, further comprising a plurality of pressure sensors, wherein the pressure sensors are disposed at four corners of the display panel.

15. The electronic device as claimed in claim 12, wherein the vibrator has a first electrode plate, a piezoelectric material and a second electrode plate, and the piezoelectric material is disposed between the first electrode plate and the second electrode plate.

16. The electronic device as claimed in claim 12, wherein the display panel has a display region, the vibrator has a first area, the display region of the display panel has a second area, and a ratio of the first area to the second area is larger than or equal to 5% and smaller than or equal to 50%.

17. The electronic device as claimed in claim 12, further comprising a support substrate disposed between the vibrator and the adhesive layer.

18. The electronic device as claimed in claim 12, wherein the vibrator is a double-layer vibrator having a thickness larger than or equal to 0.1 mm and smaller than or equal to 5 mm.

\* \* \* \* \*